United States Patent [19]

Forge

[11] Patent Number: 5,003,456
[45] Date of Patent: Mar. 26, 1991

[54] CIRCUIT FOR PROVIDING FAST OUTPUT CURRENT CONTROL IN A CURRENT MODE SWITCHING POWER SUPPLY

[75] Inventor: Charles O. Forge, Los Altos, Calif.

[73] Assignee: Uniphase Corporation, San Jose, Calif.

[21] Appl. No.: 294,635

[22] Filed: Jan. 6, 1989

[51] Int. Cl.⁵ .............................................. H02M 7/00
[52] U.S. Cl. ....................................... 363/89; 363/46; 323/285
[58] Field of Search ................. 363/39, 44, 45, 46–48, 363/78–80, 89, 124; 323/282, 285; 372/38

[56] References Cited

U.S. PATENT DOCUMENTS

| | | | |
|---|---|---|---|
| 3,733,540 | 5/1973 | Hawkins | 363/89 |
| 3,913,002 | 10/1975 | Steigerwald et al. | 363/124 |
| 4,472,672 | 9/1984 | Pacholok | 363/124 |
| 4,644,254 | 2/1987 | Panse | 363/89 |
| 4,777,409 | 10/1988 | Tracy et al. | 363/89 |
| 4,816,982 | 3/1989 | Severinsky | 363/89 |

Primary Examiner—Peter S. Wong
Attorney, Agent, or Firm—Skjerven, Morrill, MacPherson, Franklin & Friel

[57] ABSTRACT

A circuit for providing current to a laser tube permits high current, high output voltage, and high frequency modulation response (e.g., up to about 1 MHz, in one embodiment) with low power dissipation. This is accomplished by combining the output current from two current sources, one of which is a high amplitude low frequency current mode switched mode power supply, while the other current source is a low amplitude, high frequency current source.

11 Claims, 8 Drawing Sheets

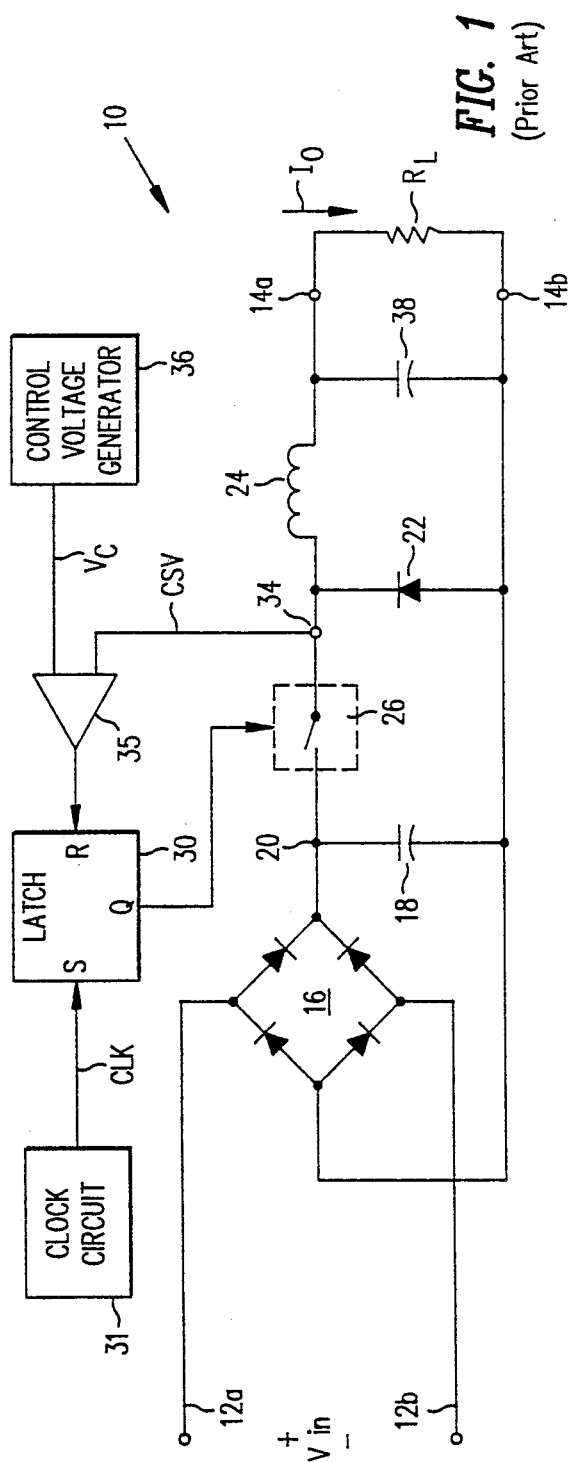
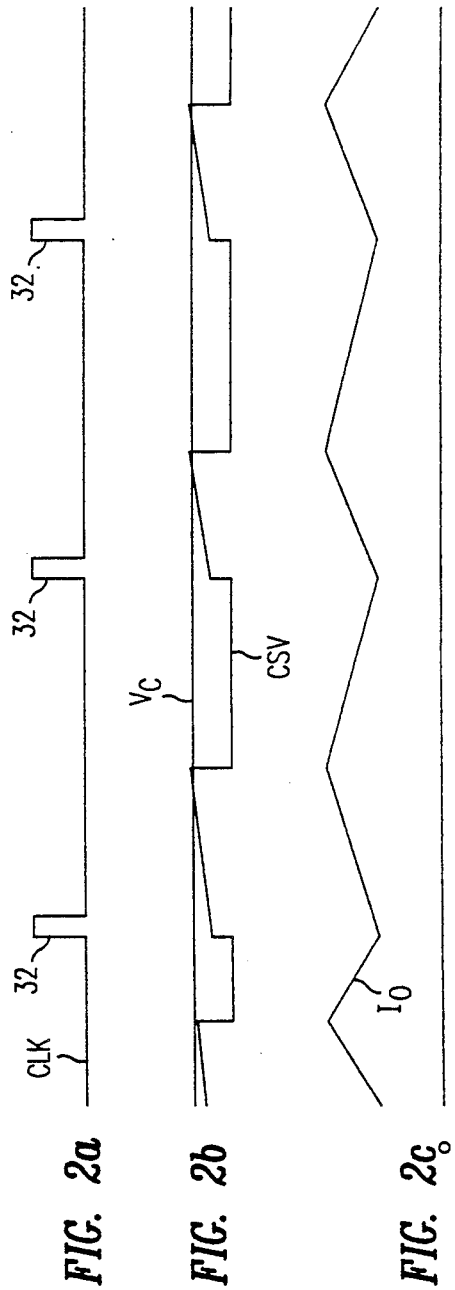

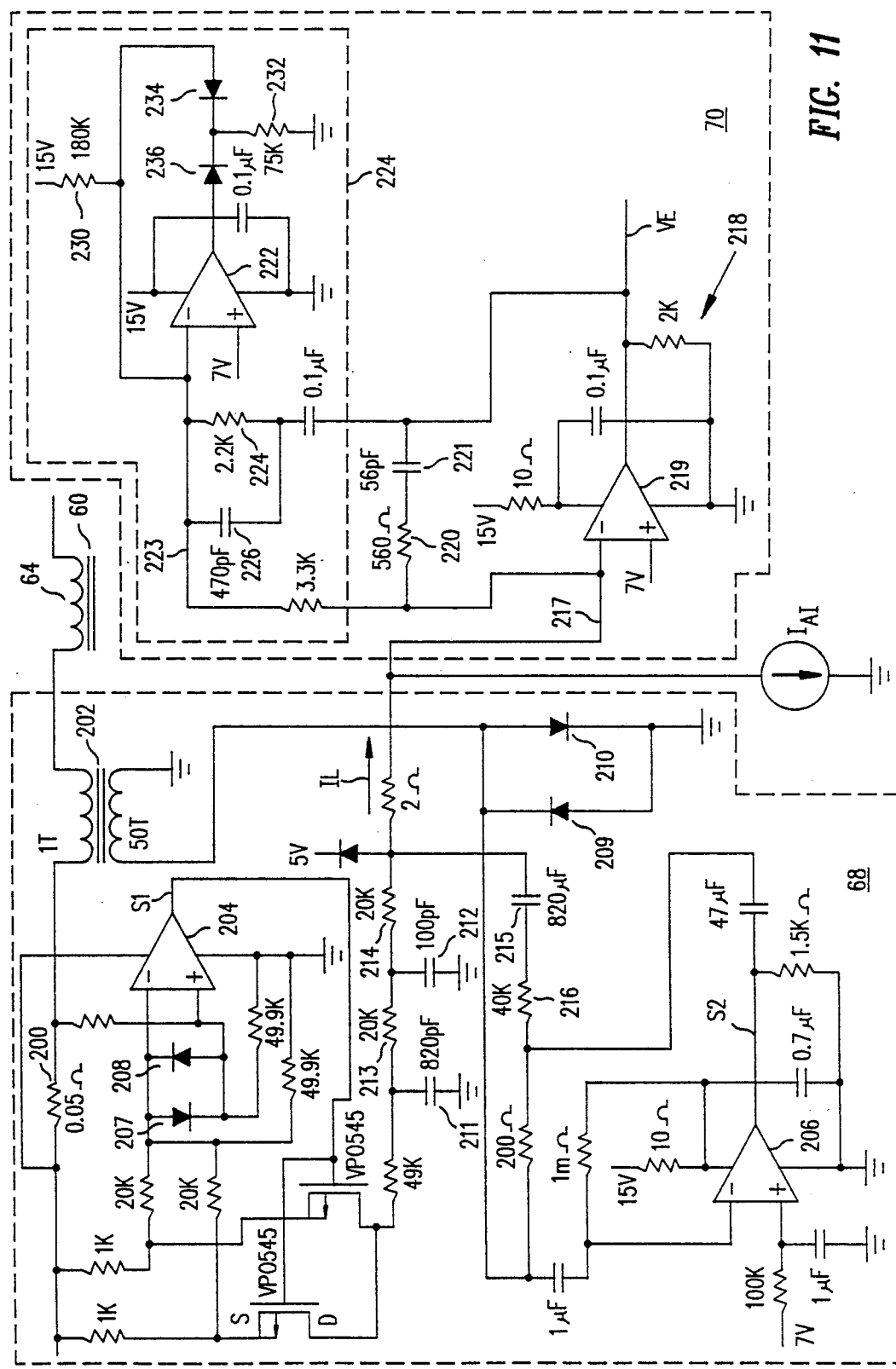

CIRCUIT FOR PROVIDING FAST OUTPUT CURRENT CONTROL IN A CURRENT MODE SWITCHING POWER SUPPLY

BACKGROUND OF THE INVENTION

This invention relates to current mode switched mode power supplies, and circuits for providing fast output current control.

FIG. 1 illustrates a typical prior art current mode switched mode power supply 10 which includes input terminals 12a, 12b for receiving an input voltage waveform $V_{in}$ (typically a 110 V 60 HZ input voltage) and output terminals 14a, 14b for providing an output current $I_0$ to a load $R_L$.

Terminals 12a, 12b are coupled to a rectifying network including a diode bridge 16 and a capacitor 18. A node 20 between diode bridge 16 and capacitor 18 is periodically coupled to a diode 22 and output inductor 24 via a switch 26. When switch 26 is closed, current flows from node 20, through switch 26, inductor 24, and through load $R_L$. Since current flows through inductor 24, magnetic flux builds up in inductor 24. When switch 26 opens, current is drawn through diode 22 by inductor 24, which in turn flows through load $R_L$.

Switch 26 is controlled by a latch 30. Latch 30 receives as one input signal a pulse train clock signal CLK FIG. 2a) from a clock circuit 31. On the rising edges 32 of signal CLK, latch 30 is set, and closes switch 26. After switch 26 closes, current $I_0$ through inductor 24 rises. This current is sensed by a current sense circuit 34, which provides a current sense voltage CSV (FIG. 2b) in response thereto. A comparator 35 compares sense voltage CSV with a control voltage Vc generated by a control voltage generator 36. When voltage CSV exceeds voltage Vc, comparator 35 resets latch 30, thus causing switch 26 to open. In this way, output current through load $R_L$ is regulated to a value dependent on control voltage Vc.

It is frequently necessary to use current mode switched mode power supplies to provide large output currents at high output voltages, e.g., several amperes at 100 to 200 volts. One example of an application of such a current source is for driving a laser tube.

As can be seen in FIG. 2c, output current $I_0$ has a certain amount of ripple which cannot be eliminated by power supply 10. Also, power supply 10 cannot be regulated to eliminate noise having a frequency greater than that of clock signal CLK, and cannot alter output current $I_0$ over time periods smaller than several periods of signal CLK. It would be desirable to provide in a current mode switched mode power supply the ability to control output current rapidly, to minimize ripple, and to minimize high frequency noise.

SUMMARY

A circuit for providing a controllable current confers the following advantages:
(1) high output current at a high voltage;
(2) low power loss;
(3) high modulation bandwidth; and
(4) essentially no ripple in output current.

These advantages are achieved by providing a current mode switching power supply and a linear wideband AC power supply. The current mode switching power supply provides the bulk of the output power (in one embodiment about 3000 Watts), but has approximately 100 mA of ripple and a long modulation response time. The linear wideband AC power supply has a short response time and essentially no ripple, and in one embodiment, provides less than 1 Watt. The output currents from these power supplies are combined using a novel current adding network with virtually no DC power loss.

BRIEF DESCRIPTION OF THE DRAWING

FIG. 1 illustrates a prior art current mode switched mode power supply.

FIGS. 2a to 2c illustrate waveforms of signals at various nodes in the circuit of FIG. 1.

FIG. 11 is a detailed schematic diagram of current sense circuit 68 and error amplifier 70 of FIG. 3.

DETAILED DESCRIPTION

Figure 3:
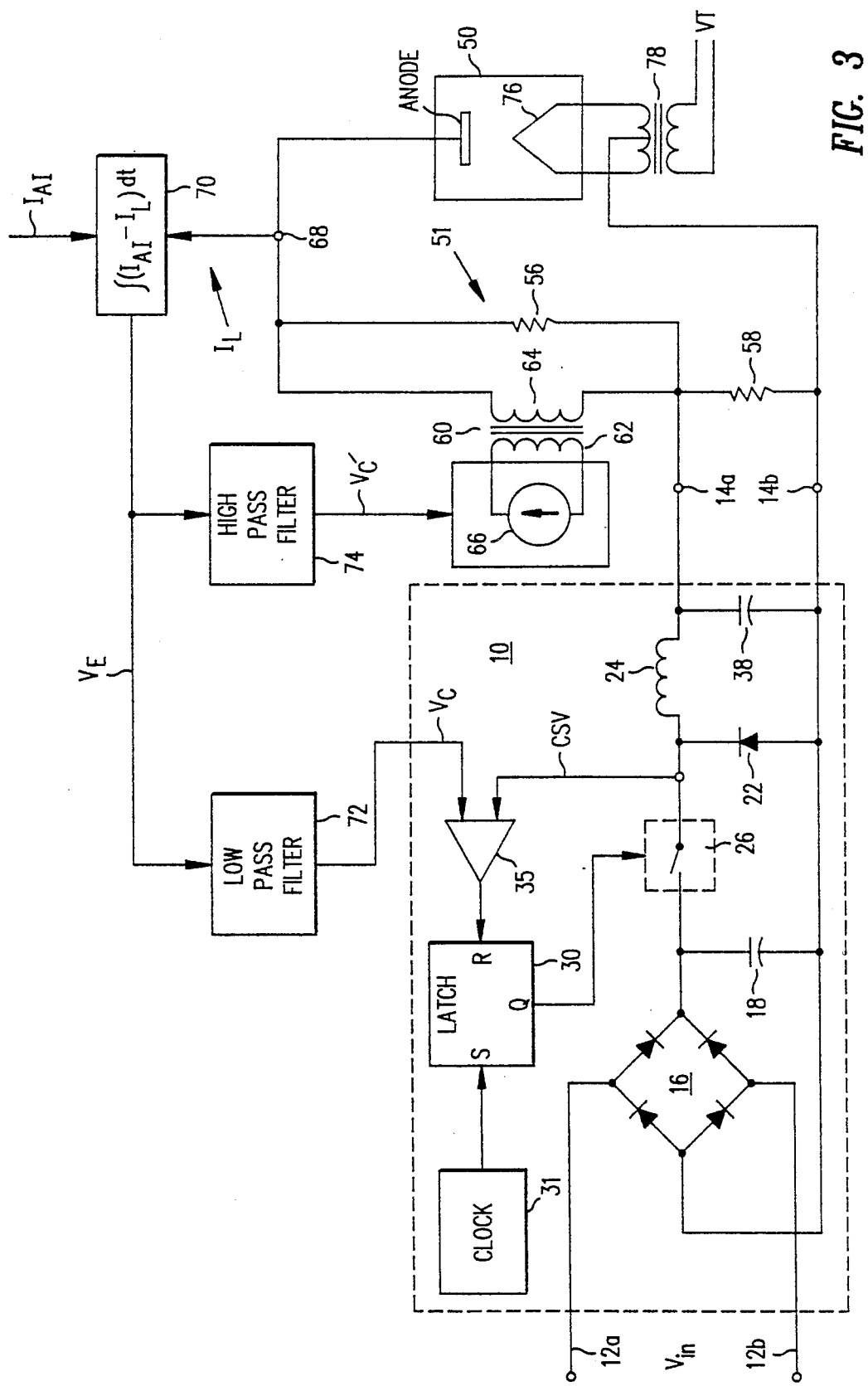
FIG. 3 illustrates a circuit constructed in accordance with my invention.

FIG. 3 illustrates current mode switched mode power supply 10 coupled to a circuit in accordance with an embodiment of my invention. The circuit of my invention provides power for a laser tube 50. As can be seen, switched mode power supply 10 is coupled to a network 51 including a first resister 56 having a resistance R, a second resistor 58 also having a resistance R (R equals about 5 ohms), and inductive transformer 60 having first and second windings 62 and 64. (Transformer 60 has a turns ratio of 1:1.)

Figure 4A:
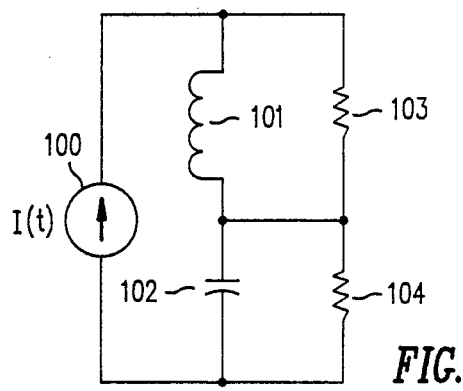
FIGS. 4a to 4d illustrate mutually equivalent RLC networks.
Figure 4B:
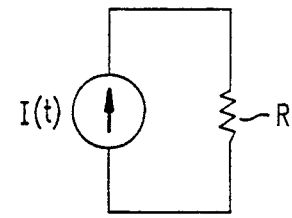

To better understand why network 51 is coupled to power supply 10, reference is made to FIG. 4a, which illustrates a current source 100 which provides a current I(t) and is coupled across a network comprising an inductor 101, a capacitor 102, and resistors 103 and 104 (each having a resistance R). It is known in the art that if $L=R^2C$, where L is the inductance of inductor 101 and C is the capacitance of capacitor 102, the impedance of the network consisting of inductor 101, capacitor 102, and resistors 103 and 104 equals R. Thus, the circuit of FIG. 4a is equivalent to the circuit of FIG. 4b. (This is proven in Appendix A of this specification.)

Figure 4C:
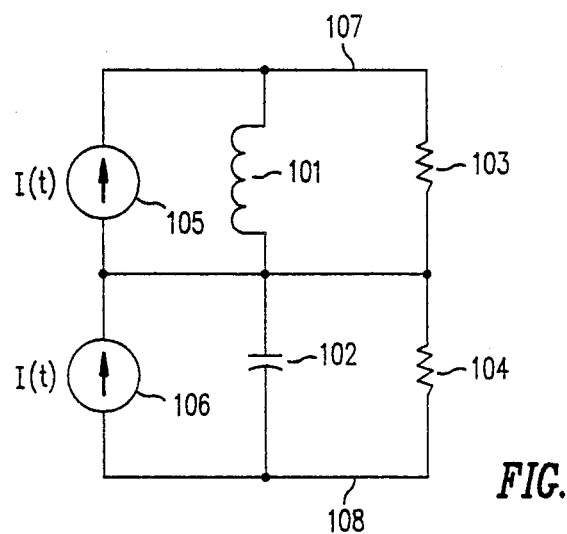

It can also be proven that the circuit of FIG. 4a is equivalent to the circuit of FIG. 4c, which includes two current sources 105, 106 (each of which produces current I(t)) instead of one current source 100. If current I(t) consists of very high frequency components (e.g. frequencies much greater than $(LC)^{-\frac{1}{2}}$), capacitor 102 acts to essentially short circuit current source 106, and the voltage across nodes 107, 108 is essentially generated by current source 105. If I(t) consists of very low frequency components (e.g. frequencies much less than $(LC)^{-\frac{1}{2}}$), current source 105 is essentially short circuited by inductor 101, and the voltage across nodes 107, 108 is generated current source 106.

Figure 4D:
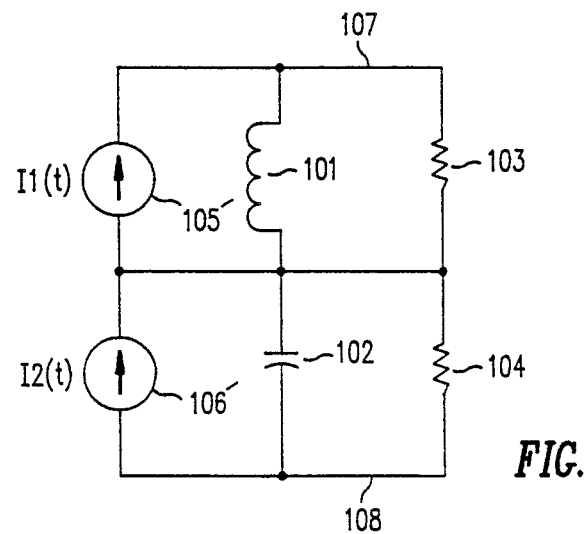

FIG. 4d illustrates a network similar to FIG. 4c, except instead of including current sources 105, 106 which each produce current I(t), the network of FIG. 4d includes current sources 105', 106' which generate currents I1(t), I2(t), respectively. I1(t) consists of those frequency components of signal I(t) above a frequency f1, where $f1 << (LC)^{-\frac{1}{2}}$. I2(t) consists of those frequency components of signal I(t) less than f2, where $f2 >> (LC)^{-\frac{1}{2}}$. Thus, signal I1(t) contains frequency components greater than $(LC)^{-\frac{1}{2}}$ and frequency components on the order of $(LC)^{-\frac{1}{2}}$. Signal I2(t) contains frequency components less than $(LC)^{-\frac{1}{2}}$ and frequency components on the order of $(LC)^{-\frac{1}{2}}$.

Current source 66 (FIG. 3) coupled to transformer 60 is the equivalent of current source 105' coupled across inductor 101, current source 10 is the equivalent of current source 106', resistors 56 and 58 are the equivalent to resistors 103 and 104, and capacitor 38 is the equivalent to capacitor 102. It is thus seen that the network of FIG. 3 is the equivalent of the network of FIG. 4d, where I1(t) and I2(t) are generated by current sources 66 and 10, respectively. Thus, current source 10 provides the high amplitude, low frequency components of signal I(t), while current source 66 provides the high frequency, low amplitude components of signal I(t). (I(t) is not shown in FIG. 3 since I(t) is the effective combined output current of current supplies 10 and 66 as described above. Current I(t), as defined above, does not actually flow through any node or lead of FIG. 3.)

Referring back to FIG. 3, a sense circuit 68 senses current through laser tube 50 and generates a sense current $I_L$ in response thereto. An error integrator 70 generates the time integral of an analog input current $I_{AI}$ minus $I_L$ to generate an error voltage VE in response thereto. Analog input current $I_{AI}$ is generated by well-known circuitry, and may be dependent on laser output light in a manner selected in accordance with customer design specifications, depending on the application to which laser 50 is being put. In another embodiment current $I_{AI}$ is generated in accordance with customer specifications in a manner that is independent of laser output light. Error voltage VE is passed through a low pass filter 72 to generate control signal Vc (used to control switched mode power supply 10). Voltage VE is also passed through a high pass filter 74 to generate a second control signal Vc', used to control current source 66. Current source 66 provides output current I1(t) which is effectively combined with output current I2(t) from current source 10. Combined currents I1(t) and I2(t) drive the network consisting of transformer 60, resistors 56, 58, capacitor 38, and laser tube 50.

In one embodiment of my invention, $(LC)^{-\frac{1}{2}}$ equals about 3 KHz, where L and C are the effective inductance of transformer 60 and capacitance of capacitor 38. High pass filter 74 passes the components of signal VE having a frequency greater than about 800 Hz, and low pass filter 72 passes the components of signal VE having a frequency less than about 12 KHz. (To ensure proper operation of my circuit, it is desirable that filters 72 and 74 each pass those components of signals VE having frequencies on the order of the resonant frequency of capacitor 38 and transformer 60.)

Because of the manner in which current source 10 is designed, it can provide high output currents (e.g. on the order of 15A) at high voltages (e.g. on the order of 200 volts), but it provides a high frequency ripple output current (several hundred milliamperes peak to peak at about 100 KHz) caused by the switch 26 turning on and off. (Signal CLK has a frequency of about 100 KHz.) Further, because the switching frequency of switch 26 is about 100 KHz, it is not possible to modulate output current I2(t) of power supply 10 in less than a few switching periods (i.e. a few tens of microseconds) of switch 26.

In contrast, current source 66 has no ripple (because it is not a switching current supply). Also, output current I1(t) of current source 66 can be modified almost instantaneously. While current source 66 is limited as to the output current and output voltage (e.g. less than 500 mA and 15 volts), it is capable of countering the ripple in signal I2(t) and providing high frequency fast response, so that one can modulate effective current I(t) with an equivalent bandwidth of 1 or more MHz.

As mentioned above, signal VE is passed through low pass filter 72 before reaching comparator 35. The reason for this is that signal VE contains a wide frequency band component (laser plasma noise) having frequency components above 20 KHz. If this wide frequency band component were not filtered out, power supply 10 would modulate signal CLK with this component, thereby distorting output current waveform I2(t). Low pass filter 72 removes this high frequency component so that this modulation does not occur.

Similarly, signal VE is passed through high pass filter 74 to remove high amplitude low frequency components from signal VE. These low frequency components are generated by a 60 HZ signal VT (used to drive a laser filament 76 via a transformer 78) and 60 Hz noise from input waveform $V_{in}$. If these low frequency components were not removed, the transistors in the output stage of current source 66 would be driven into saturation, thus preventing current source 66 from functioning properly.

Figure 5:
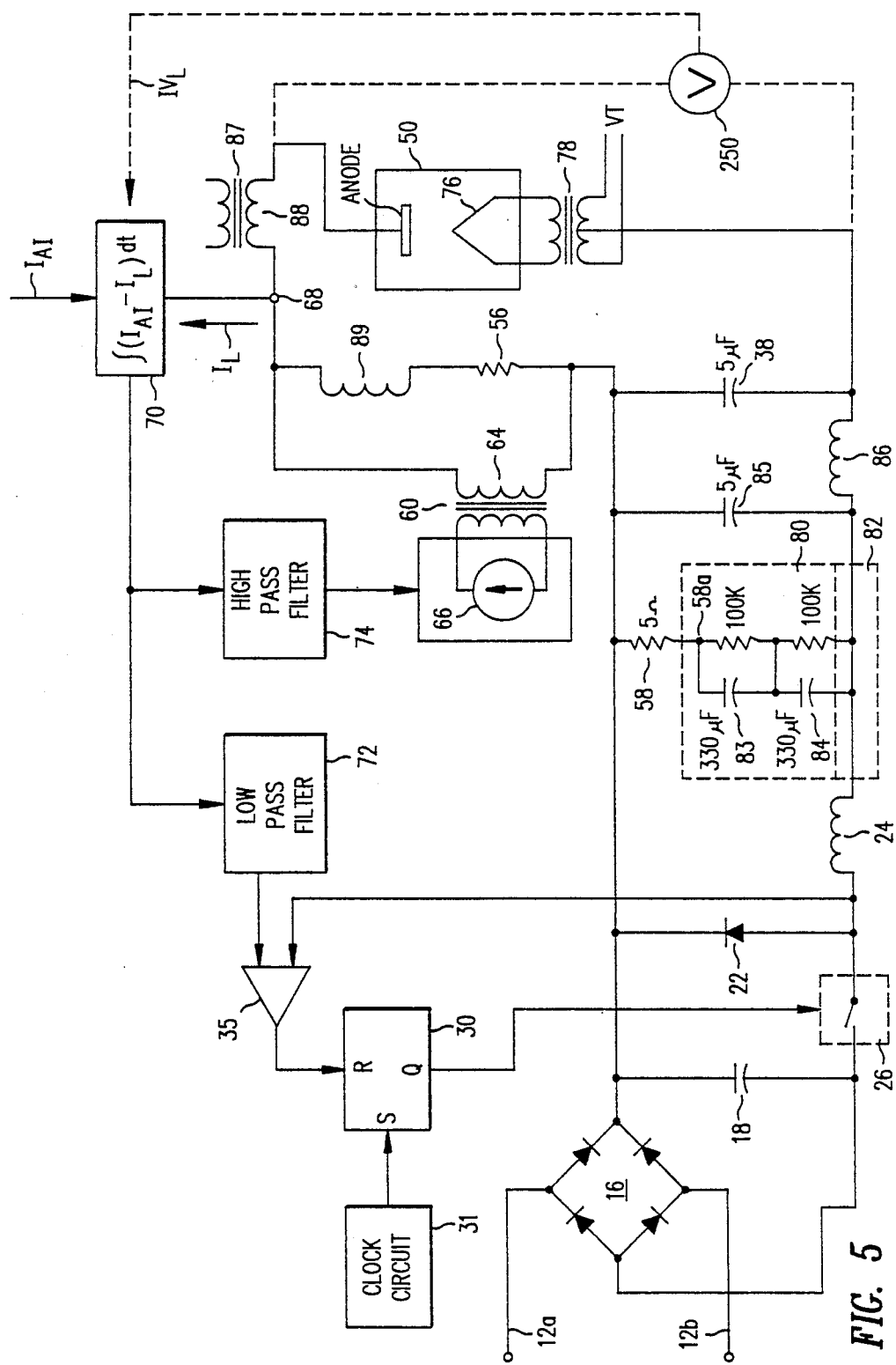
FIG. 5 illustrates a circuit constructed in accordance with another embodiment of my invention.

FIG. 5 illustrates a second embodiment of the circuit of FIG. 3. In the embodiment of FIG. 5, instead of connecting switch 26 and inductor 24 to the terminal of power supply 10 coupled to winding 64, switch 26 and inductor 24 are coupled to the terminal of power supply 10 connected to transformer 78. Also, a resistor/capacitor network 80 is connected between resistor 58 and a node 82. Network 80 includes series coupled capacitors 83 and 84 which have values sufficiently high so that at frequencies on the order of 3 KHz, capacitors 83, 84 function so as to short lead 58a of resistor 58 to node 82. Network 80 is provided in order to avoid DC current in resistor 58. (Such a DC current would cause resistor 58 to dissipate a large amount of power, e.g. about 8000 watts.)

Also included in FIG. 5 is an added filter capacitor 85 and filter inductor 86, which reduce unwanted output current ripple and other noise from the output current of power supply 10.

Also illustrated in FIG. 5 is a transformer 87 coupled between transformer winding 64 and laser tube 50. Transformer 87 is provided in a well known manner to supply power when starting laser 50, but thereafter, is not used. After laser 50 is running, winding 88 of transformer 87 exhibits a series inductance of about 20 μH with laser tube 50, and thus tends to block high frequency components of current I(t). To counter the effects of winding 88, an 80 μH inductor 89 is provided in series with resistor 58. If inductor 89 were not present, the circuit of FIG. 5 would be equivalent to FIG. 6.

Figure 6:
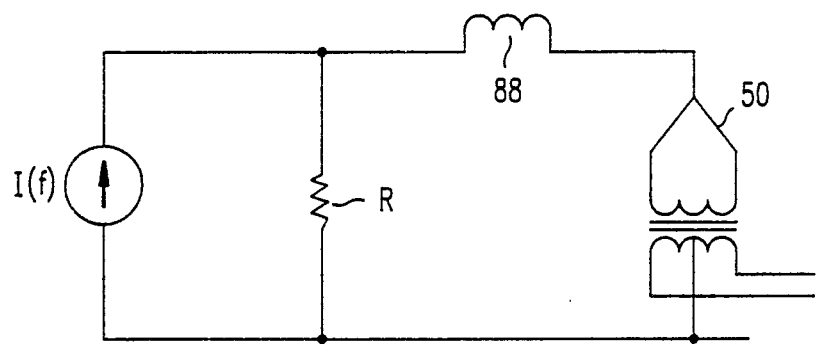
FIG. 6 illustrates an RL network which would be equivalent to the circuit of FIG. 5 if inductor 89 were removed.
Figure 7:
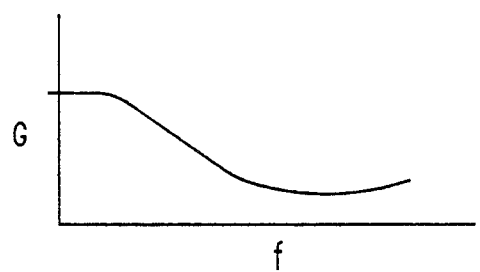
FIG. 7 illustrates the gain versus frequency curve of the circuit of FIG. 6.
Figure 8:
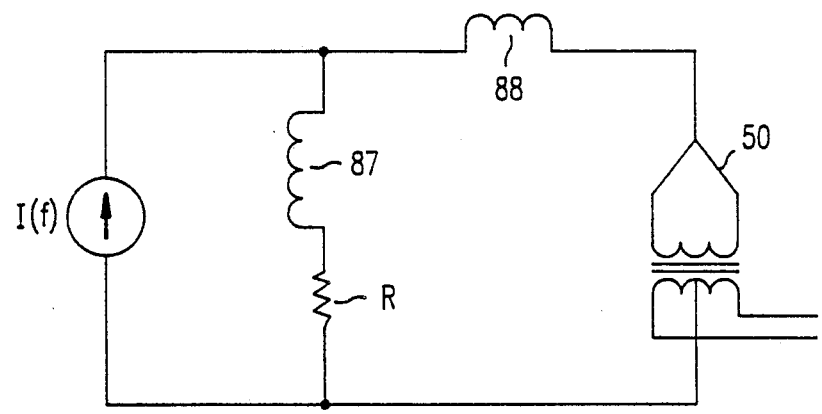
FIG. 8 illustrates an RL network equivalent to the circuit of FIG. 5.

The effective gain vs. frequency characteristic of the $R_L$ network of FIG. 6 is illustrated in FIG. 7. As can be seen, above a frequency of about 40 KHz the amplitude of the signal which reaches laser tube 50 drops off. To prevent this from happening, inductor 89 is provided. Thus, the circuit of FIG. 5 is actually equivalent to the circuit of FIG. 8, which has a flat frequency response.

Referring back to FIG. 5, although switch 26 is illustrated as being driven by latch 30, in another embodiment, switch 26 is controlled as described in my copending application Ser. No. 07/294,157, entitled "Current Mode Switching Regulator with Programmed Off-time", filed on the same date as the present application and incorporated herein by reference.

Figure 9:
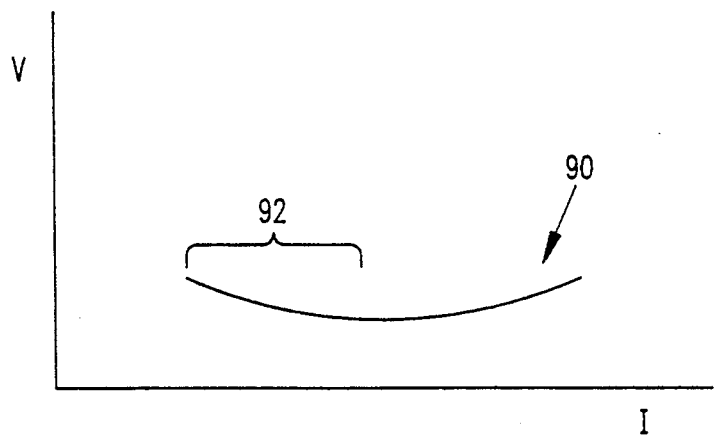
FIG. 9 illustrates the current vs. voltage characteristic curve of laser tube 50.

It is noted that a laser tube typically has an current vs. voltage characteristic 90 curve as illustrated in FIG. 9, including a negatively sloped portion 92 having an effective AC resistance of about $-1$ to $-2$ ohms. If a laser tube having a negative resistance were merely coupled across a current source 10, the output current would tend to oscillate. However, network 51 provides an effective 5 ohm resistance in parallel with the $-1$ to $-2$ ohm resistance of laser tube 50 to prevent such oscillation.

Figure 10:
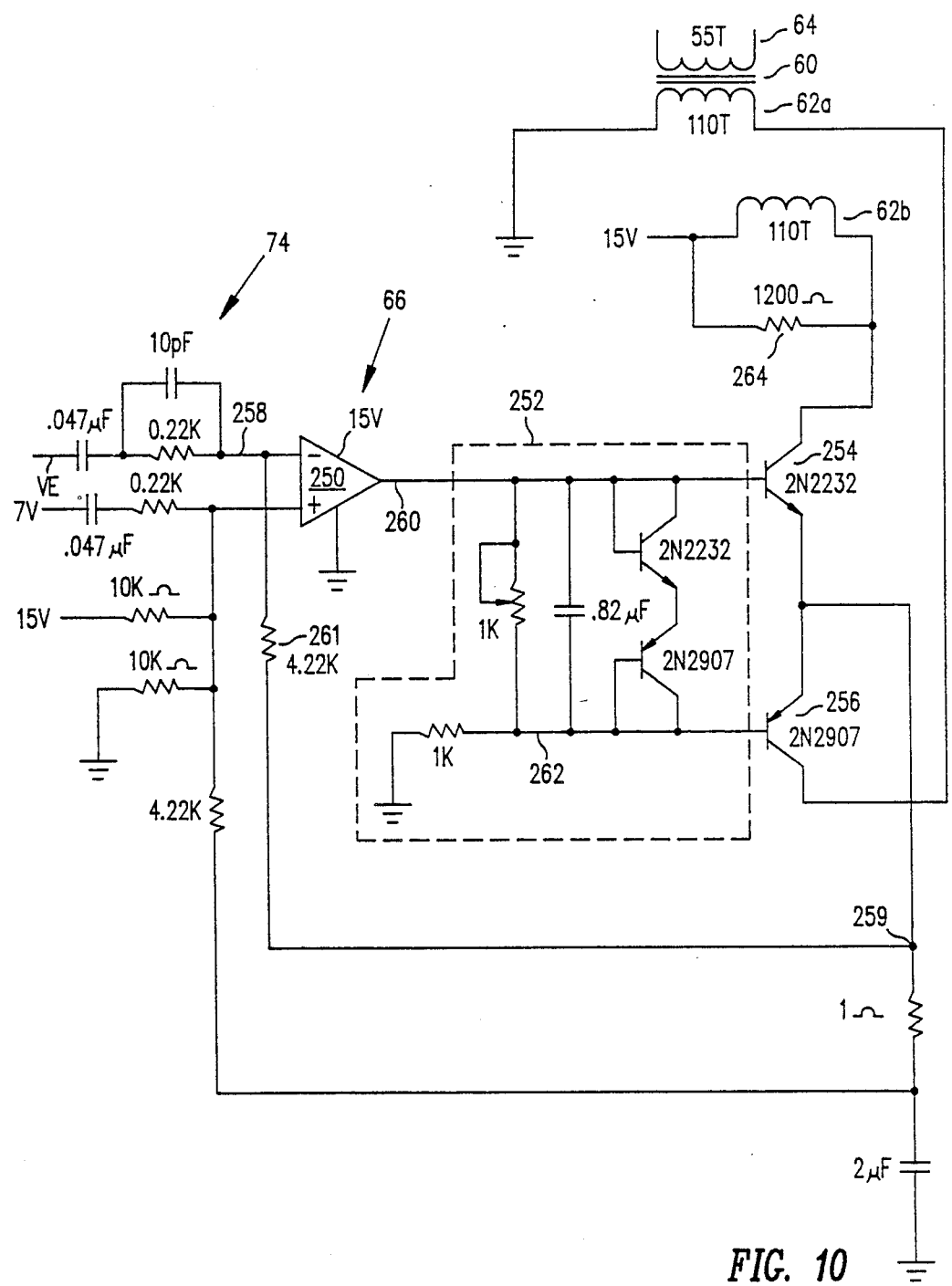
FIG. 10 is a detailed schematic diagram of current source 66 in FIG. 5.

FIG. 10 is a detailed schematic diagram of high pass filter 74, current source 66 and an embodiment of transformer 60 which includes primary windings 62a, 62b, driven by transistors 254, 256, which in turn are driven by operational amplifier 250 and biasing circuit 252 in response to the high frequency components of signal VE. When voltage VE decreases, the voltage at lead 258 decreases, and operational amplifier 250 responds by increasing the voltage at lead 260. The voltage increase at lead 260 turns on transistor 254, causing current to flow through winding 62b, transistor 254, and to lead 258, which in turn causes current to flow through winding 64 (because of the magnetic coupling between windings 62a and 64). (Windings 64 and 62b have 55 and 110 turns, respectively.) Current through transistor 254 also increases the voltage at lead 258 via feedback resistor 261. Similarly, if the voltage at lead 258 is increased in response to signal VE, operational amplifier 250 decreases the voltage at lead 262, thereby causing current to flow from node 259, through transistor 256, through winding 62a, and to ground, thereby causing current to flow through lead 64. (Current flowing from node 259 through transistor 256 also reduces the voltage through lead 258.) It is thus seen that current source 66 drives winding 64 with current dependent on signal VE. If signal VE is constant (i.e. has no high frequency component), neither transistor 254 or 256 conducts significantly, so current source 66 draws substantially no DC power.

Resistor 264 of FIG. 10 is provided across winding 62b to lower the Q of the network consisting of transformers 60 and 87 and the parasitic capacitance of the cable connecting the power supply to laser tube 50 in order to prevent resonance.

FIG. 11 illustrates in detail current sense circuit 68 and error amplifier 70. Current sense circuit 68 includes a resistor 200 and transformer 202 coupled in series with winding 64. Resistor 200 is coupled across an operational amplifier 204 to generate a signal S1 corresponding to the low frequency components of signal $I_L$. Transformer 202 is coupled to an operational amplifier 206 to generate a signal S2 corresponding to the high frequency components of signal $I_L$. Signals S1, S2 are combined and presented to error amplifier 70, which generates signal VE in response to signals $I_L$ and $I_{AI}$.

Coupled to operational amplifier 204 are diodes 207, 208, which prevent large transients in the current through winding 64 from damaging the circuit. Diodes 209, 210 perform a similar function. Capacitors 211, 212, and resistors 213, 214 form a low pass filter, while capacitor 215 and resistor 216 form a high pass filter. The low and high pass filters should be matched so that current IL reflects all the frequency components of the current through winding 64. A current equal to $I_L$ minus $I_{AI}$ is received by input lead 217 of error amplifier 70, which includes an integrating network 218 comprising an operational amplifier 219, a resistor 220, and a capacitor 221. Coupled to integrating network 218 is an operational amplifier 222 which normally holds a node 223a at 6.3 volts, which in turn insures that node 223 is held at 7 volts. However, if voltage VE causes an excessive current through the RC network consisting of resistor 224 and capacitors 225 and 226, node 223 is no longer held at 7 volts. Under these conditions, the interaction between the circuit elements in box 224 and integrating network 218 causes the gain of integrating network 218 to drop, which prevents signal VE from saturating current source 66.

While the circuit of FIG. 5 drives a laser tube 50, in another embodiment, the current of FIG. 5 drives devices other than laser tubes, e.g. motors, arc lamps, or other high power loads which require high modulation bandwidth. Also, instead of using a current sense circuit to provide a sense current $I_L$ to error integrator 70, in another embodiment, a voltage sense circuit 250, shown in phantom in FIG. 5, provides a voltage sense current $IV_L$ which is coupled to error integrator 70. In this embodiment, error integrator 70 generates signal VE in response to current $IV_L$ minus current $I_{AI}$.

As in the previous embodiments involving current feedback, signal $I_{AI}$ may be dependent on laser output light or independent of laser output light. As mentioned above, a circuit in accordance with my invention can be used to power loads other than lasers. In such embodiments, signal $I_{AI}$ may be dependent on an output signal generated by these loads or may be independent of the signals generated by these loads.

Figure 12A:
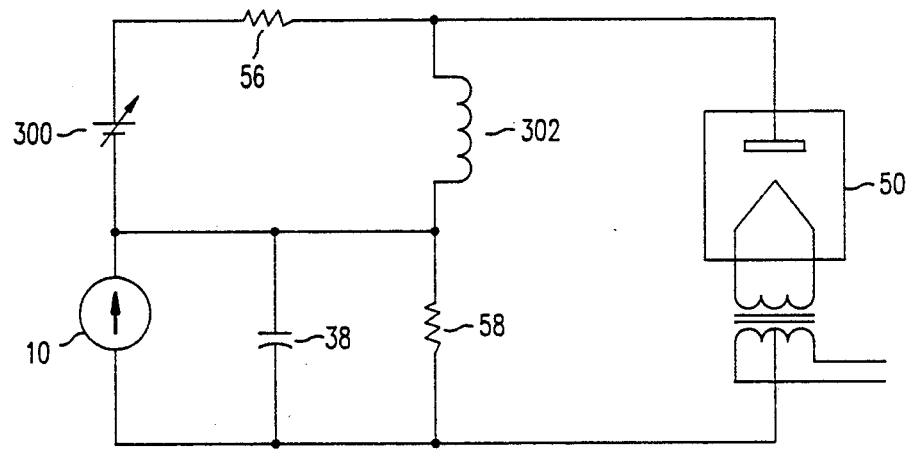
FIGS. 12a and 12b schematically illustrates a circuit in accordance with other embodiments of my invention.

FIG. 12a illustrates a circuit constructed in accordance with another embodiment of my invention. As is known in the art, a current source coupled across a resistor is the equivalent of a voltage source in series with a resistor. Accordingly, in the embodiment of FIG. 12a, instead of using high bandwidth current source 66 coupled across resistor 56 as shown in FIG. 3, a high bandwidth voltage source 300 is provided in series with resistor 56. The series-coupled voltage source 300 and resistor 56 are coupled across an inductor 302 as shown. This embodiment is useful in a design which does not include winding 88 in series with laser 50, since the presence of winding 88 would cause the frequency response of the circuit to fall off. The embodiment of FIG. 12a would also be useful if a switch is connected across winding 88 to effectively remove winding 88 from the circuit after the laser is started. In the embodiment of FIG. 12a, voltage source 300 is responsive to at least the high frequency components of control signal Vc. Of importance, voltage source 300 has a shorter response time to control signal Vc than current source 10, so that voltage source 300 can remove ripple or high frequency noise from the waveform produced by current source 10.

Figure 12B:
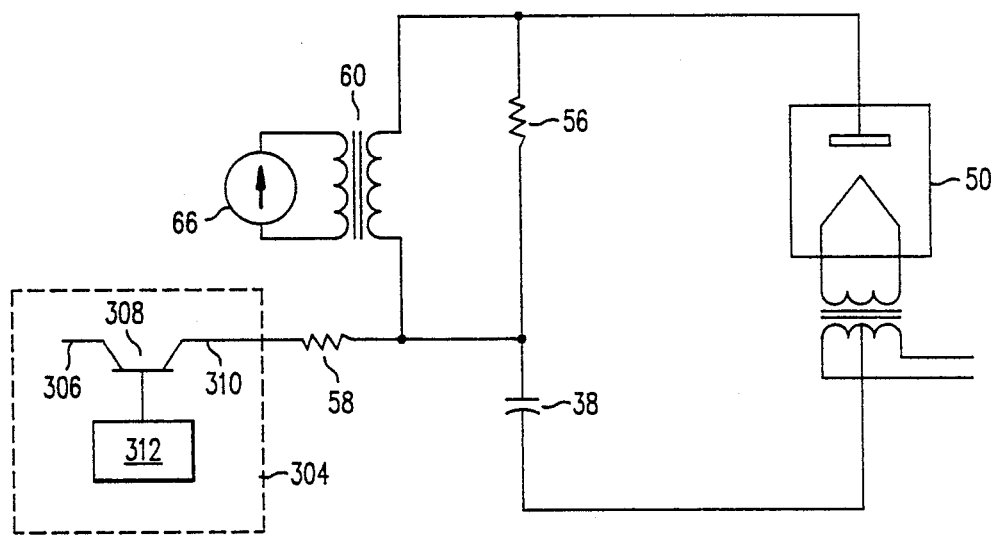

As illustrated in FIG. 12b, current source 10 and resistor 58 may also be replaced by a voltage supply 304 coupled in series with resistor 58. Voltage source 304 may be either a switching voltage supply or a linear voltage supply. In the embodiment shown in FIG. 12b, voltage source 304 is a linear voltage source which receives an input DC voltage at a lead 306. A transistor 308 controls the amount of current permitted to flow between lead 306 and a node 310, thereby controlling the voltage at node 310. A control circuit 312 controls the conductivity of transistor 308 by applying an appropriate control voltage Vb at the base of transistor 308. Voltage Vb may be either responsive to the current through laser 50, the output voltage at node 310, or may be generated in any other desired manner.

Of importance, in the embodiments of FIGS. 12a and 12b, the equivalent of current source 66 and resistor 56 has a shorter response time (and thus a higher bandwidth) than the equivalent of current source 10 and resistor 58.

While the invention is described with reference to specific embodiments, those skilled in the art will recognize that changes can be made in form and detail without departing from the spirit and scope of the invention. Accordingly, all such changes come within the present invention.

APPENDIX A

As mentioned above, the impedance of inductor 101, capacitor 102, and resistors 103, 104 equal resistance R, where R is the resistance of resistors 103 and 104 if $L=R^2C$. The proof of this is as follows.

(1) The impedance Z1 of an inductance L in parallel with a resistor R (i.e. inductor 101 in parallel with resistor 103) is $$Z1 = \frac{1}{\frac{1}{R} + \frac{1}{SL}} = \frac{SL}{1 + SL/R}$$

(2) The impedance Z2 of a capacitance C in parallel with resistance R (i.e. capacitor 102 in parallel with resistor 104) is $$Z2 = \frac{1}{SC + \frac{1}{R}} = \frac{R}{1 + SCR}$$

(3) The impedance ZT of the network of FIG. 4a is $$ZT = Z1 + Z2 = \frac{SL}{1 + SL/R} + \frac{R}{1 + SCR}$$

(4) If $L/R = RC = \tau$, $$ZT = \frac{SL}{1 + S\tau} + \frac{R}{1 + S\tau} = \frac{R + SL}{1 + SL/R} =$$

$$\frac{R(1 + SL/R)}{1 + SL/R} = R$$

if $L=R^2$.

I claim:

1. A power supply comprising:
   means for receiving a first control signal;
   first means for generating a first current in response to low frequency components of said first control signal;
   second means for generating a second current in response to high frequency components of said first control signal; and
   output means for generating an output current in response to said first and second currents wherein said output current is a substantially flat frequency function of said first control signal.

2. Power supply of claim 1 wherein said output means comprises a resistor and capacitor coupled in parallel with said first means, said parallel-coupled resistor and capacitor coupled in series with an equivalent of an inductor coupled in parallel with said second means.

3. Power supply of claim 2 wherein said equivalent comprises a transformer having a first winding coupled across said second means and a second winding coupled in series with said parallel-coupled resistor and capacitor.

4. Power supply of claim 3 wherein said output means is coupled across a laser tube.

5. Power supply of claim 1 wherein said first means is current mode switching power supply.

6. Power supply of claim 5 wherein said second means is responsive to frequency components of said first control signal greater than a switching frequency of said current mode switching power supply.

7. Power supply of claim 6 wherein said second means is responsive to components of said first control signal having frequencies on the order of 1 MHz.

8. Power supply of claim 6 wherein said second means comprises a transistor amplifier.

9. Power supply of claim 1 wherein said first means and said second means each comprise a resistor coupled in series with a voltage source.

10. Power supply of claim 1 wherein said second means is responsive to frequency components having at least twice the frequency of the highest frequency components that said first means is responsive to.

11. A power supply comprising:
    means for receiving a first control signal;
    first means for generating a first current in response to low frequency components of said first control signal;
    second means for generating a second current in response to high frequency components of said first control signal; and
    output means for generating an output current in response to said first and second currents wherein said output current is a particular function of said first control signal.

* * * * *